(12) United States Patent
Miyake et al.

(10) Patent No.: US 10,300,773 B2
(45) Date of Patent: May 28, 2019

(54) TAILGATE STRUCTURE

(71) Applicant: HONDA MOTOR CO., LTD., Tokyo (JP)

(72) Inventors: Yoshinori Miyake, Saitama (JP); Masaru Takata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 15/379,703

(22) Filed: Dec. 15, 2016

(65) Prior Publication Data

US 2017/0174059 A1 Jun. 22, 2017

(30) Foreign Application Priority Data

Dec. 16, 2015 (JP) .................................. 2015-245066

(51) Int. Cl.
| | |
|---|---|
| *B60J 5/10* | (2006.01) |
| *E05D 5/02* | (2006.01) |
| *B60J 1/00* | (2006.01) |
| *B60J 1/18* | (2006.01) |

(52) U.S. Cl.
CPC ............ *B60J 5/107* (2013.01); *E05D 5/0207* (2013.01); *B60J 1/006* (2013.01); *B60J 1/18* (2013.01)

(58) Field of Classification Search
CPC ....................................................... B60J 5/107
See application file for complete search history.

(56) References Cited

U.S. PATENT DOCUMENTS

| | | | | |
|---|---|---|---|---|
| 8,894,128 | B2 * | 11/2014 | Barral ...................... | B60J 5/107 296/146.6 |
| 9,469,180 | B2 * | 10/2016 | Kamimura ............... | B60J 5/107 |
| 9,649,917 | B2 * | 5/2017 | Ikeda ........................ | B60J 5/102 |
| 9,713,949 | B2 * | 7/2017 | Kamimura ............... | B60J 5/101 |

(Continued)

FOREIGN PATENT DOCUMENTS

| | | |
|---|---|---|
| CN | 103375079 A | 10/2013 |
| JP | H07-37747 U | 7/1995 |

(Continued)

OTHER PUBLICATIONS

Japanese Office Action with English Translation dated Sep. 26, 2017, 6 pages.

(Continued)

*Primary Examiner* — Catherine A Kelly
(74) *Attorney, Agent, or Firm* — Rankin, Hill & Clark LLP

(57) ABSTRACT

Even when a heavy load is applied to a tailgate of resin, deformation of the tailgate is inhibited. The tailgate includes a window frame portion of resin forming a window opening portion. The window frame portion includes a bottom wall located on the vehicle interior side, and an outer sidewall and an inner sidewall each of which extending from the corresponding either one end of the bottom wall. The tailgate connects the exterior ends of an outer sidewall and an inner sidewall to form a closed cross-section, and includes a hinge reinforcement member fitted to a hinge mechanism. The hinge reinforcement member includes an outer sidewall reinforcement portion along the outer sidewall. The hinge member is fastened to the outer sidewall reinforcement portion and the outer sidewall together by a connection bolt and a nut.

12 Claims, 8 Drawing Sheets

(56) References Cited

U.S. PATENT DOCUMENTS

| | | | |
|---|---|---|---|
| 9,849,760 B2 * | 12/2017 | Adachi | B60J 5/107 |
| 9,963,021 B2 * | 5/2018 | Miyake | B60J 5/107 |
| 9,981,535 B2 * | 5/2018 | Ueno | B60J 5/101 |
| 9,994,092 B2 * | 6/2018 | Kamimura | B60J 5/107 |
| 2013/0285415 A1 | 10/2013 | Landholm et al. | |
| 2016/0075216 A1 * | 3/2016 | Kamimura | B60J 5/101 296/146.2 |
| 2016/0236723 A1 * | 8/2016 | Ikeda | B60J 5/0461 |
| 2016/0347155 A1 * | 12/2016 | Kuntze | B60J 5/101 |
| 2017/0066306 A1 * | 3/2017 | Ueno | B60J 5/101 |
| 2017/0174055 A1 * | 6/2017 | Demange | B62D 25/10 |
| 2017/0174056 A1 * | 6/2017 | Kuntze | B60J 5/107 |
| 2018/0056763 A1 * | 3/2018 | Motohashi | B60J 5/107 |

FOREIGN PATENT DOCUMENTS

| | | |
|---|---|---|
| JP | 2011-057188 | 3/2011 |
| JP | 2011-136606 | 7/2011 |
| JP | 2013-220688 | 10/2013 |
| JP | 2014-131896 | 7/2014 |

OTHER PUBLICATIONS

Chinese Office Action dated Jun. 25, 2018, with English translation, 14 pages.

* cited by examiner

TAILGATE STRUCTURE

BACKGROUND OF THE INVENTION

Field of the Invention

The present invention relates to a tailgate structure provided with a hinge for axially supporting a tailgate on a vehicle body.

Description of the Related Art

For example, Patent Document 1 (JP 2011-136606 A) discloses a reinforcement structure of a backdoor of resin provided with an inner panel of resin, an outer panel of resin, and hinge reinforcements (reinforcement members) of metal.

According to Patent Document 1, forces applied to the inner panel and the outer panel are made easily transfer to the hinge reinforcements (reinforcement members) of the backdoor (tailgate) so that distortion and deformation are hardly generated.

SUMMARY OF THE INVENTION

For the reinforcement structure of the backdoor of resin disclosed by Patent Document 1, a hinge reinforcement serving as a reinforcement member is formed with a C-shaped cross-section that is the same as that of the inner panel, such as to extend along the inner panel.

Consequently, in the technology according to Patent Document 1, for example, if a heavy load is applied to the backdoor (tailgate), it sometimes happens that the hinge reinforcement (reinforcement member) is deformed such that a C-shaped cross-section opens, in other words, an opening deformation is created, so that the backdoor (tailgate) is deformed.

The present invention has been developed, addressing the above-described problem, and an object of the invention is to provide a tailgate structure capable of inhibiting deformation of a tailgate of resin even in case that a heavy load is applied to the tailgate.

In order to attain the above-described object, in an aspect of the present invention, a tailgate structure having a hinge for axially supporting a tailgate on a vehicle body includes: a window frame portion made of resin and forming a window opening portion; and a hinge reinforcement member fitted to the hinge, wherein the window frame portion includes a bottom wall, one sidewall and another one sidewall, each of the one and the other one sidewalls standing up from corresponding either end of the bottom wall, and wherein the hinge reinforcement member forms a closed cross-section by connecting a tip end portion of the one sidewall and a tip end portion of the other one sidewall.

In this aspect of the present invention, the hinge reinforcement member connects the respective tip end portions of the one sidewall and the other sidewall, and thereby the window frame portion of resin have a closed cross-section. Thus, for example, if a heavy load is input to the tailgate, the heavy load can be transferred to the vehicle body through the hinge and the hinge reinforcement member. Thus, opening deformation such that the window frame portion opens can be inhibited and deformation of the tailgate can be inhibited. As a result, according to the present invention, even when the window frame portion of the tailgate is made of resin, a desired rigidity can be easily ensured.

Further, in this aspect of the invention, as a conventionally used hinge reinforcement member can be used to form a closed cross-section, it is unnecessary to add a separate member, and a simple structure can be arranged.

In another aspect of the invention, the hinge reinforcement member includes a sidewall reinforcement portion along the one sidewall; and the hinge is fastened to the sidewall reinforcement portion and the one sidewall together.

In this aspect of the invention, the sidewall reinforcement portion is arranged along the one sidewall of the window frame portion of resin, the strength of the one sidewall can be improved. Further, as the three, which are the hinge, the sidewall reinforcement portion, and the one sidewall, are fitted by being fastened together (connected by fastening), if a heavy load is input to the tailgate, a load can be directly transferred from the one sidewall to the hinge. In such a manner, opening deformation such that the window frame portion opens can be inhibited and deformation of the tailgate can be even more inhibited. Further, the manufacturing cost can be reduced by decreasing the number of fitting processes and the number of components. Still further, by disposing the outer sidewall reinforcement portion of the hinge reinforcement member along and adjacent to the one sidewall, it is possible to efficiently ensure a wire lining space for works of lining wires such as harness even with, for example, the comparatively small closed cross-section.

In still another aspect of the invention, the bottom wall includes an interior expanding portion expanding toward vehicle interior side, and an exterior expanding portion expanding toward vehicle exterior side; the sidewall reinforcement portion is located on the one sidewall side of the interior expanding portion; and a seal member sealing the tailgate and vehicle body is in contact with a surface of the exterior expanding portion, the surface adjoining the vehicle interior side.

In this aspect of the invention, as the interior expanding portion is located on the side of the one sidewall, the sidewall reinforcement portion can be arranged in a non-contact state with the window frame portion. Further, as the exterior expanding portion is extending toward the vehicle exterior side, it is possible to endure a space for disposing the seal member, and improve the surface accuracy for making the seal member contact with the bottom wall (exterior expanding portion). In this aspect of the invention, the bottom wall of the window frame portion is structured by the interior expanding portion and the exterior expanding portion, and it is thereby possible to efficiently utilize the space adjacent to the bottom wall.

In yet another aspect of the invention, the sidewall reinforcement portion includes a fitting portion fitted to the one sidewall, and a separated portion separated from the one sidewall; and the fitting portion and the separated portion are arranged such as to form a concavity and convexity shape on the same member.

In this aspect of the invention, there are arranged the separated portion, which does not require fitting of the sidewall reinforcement portion to the one sidewall, and the fitting portion, which requires fitting the sidewall reinforcement portion to the one sidewall, and it is thereby possible to ensure the accuracy of the fitting surface, of the fitting portion, for fitting to the one sidewall. Further, as the fitting portion and the separated portion are formed on the same member and in a concavity and convexity shape, it is possible to improve the rigidity of the sidewall reinforcement portion, compared with a case of a flat plate without a concavity and convexity shape.

In still another aspect of the invention, the hinge reinforcement member includes a plurality of opening portions, and a connection portion between the opening portions adjacent to each other; and the connection portion and the fitting portion are disposed at positions superposed with each other along a vehicle transverse direction.

In this aspect of the invention, as the connection portion and the fitting portion are disposed at positions superposed with each other along the vehicle transverse direction, the rigidity of the hinge reinforcement member and the rigidity of the closed cross-section can be improved with a minimum increase in the weight. For example, in case that a heavy load is input to the tailgate, a load that is input from the fitting portion is suitably absorbed by the hinge reinforcement member having rigidity, and it is thereby possible to inhibit the deformation of the tailgate.

In yet another aspect of the invention, the tailgate includes a window glass that is disposed such as to face the hinge reinforcement member and is separated from the hinge reinforcement member toward the vehicle exterior side; and the window glass is bonded only to the window frame portion.

In this aspect of the invention, the window glass is bonded not to the hinge reinforcement member but to the window frame portion (the outer sidewall) only. Thus, the degree of freedom of setting the rear defroster and the like can be increased. Conversely, by bonding the window glass also to the inside of the window frame portion, as necessary, the rigidity can be even more improved.

According to the present invention, it is possible to obtain a tailgate structure capable of inhibiting deformation of a tailgate of resin even in case that a heavy load is applied to the tailgate.

PREFERRED EMBODIMENT OF THE INVENTION

Figure 1:
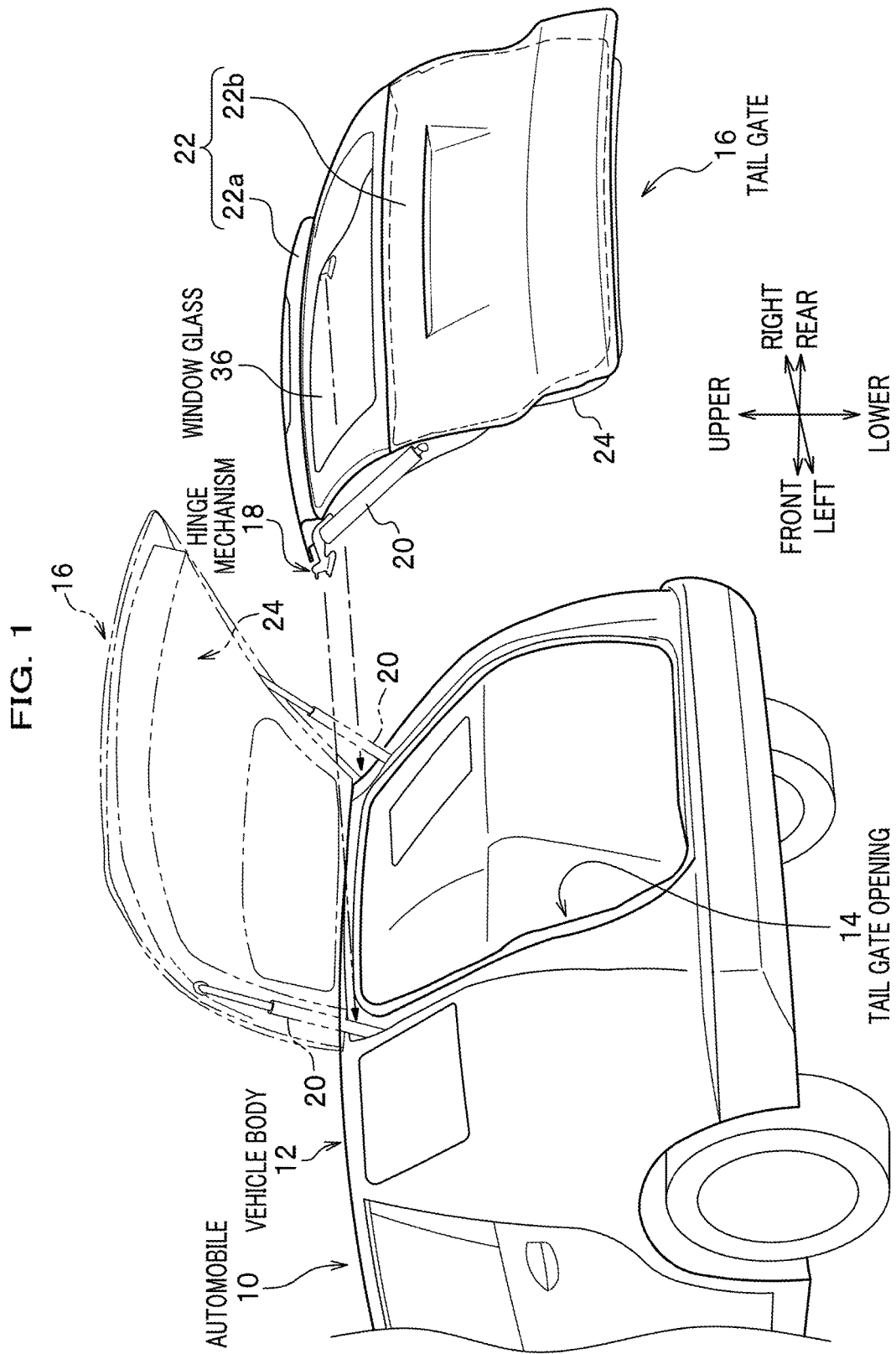
FIG. 1 is an exploded perspective view of a vehicle body rear part of an automobile, wherein a tailgate structure in an embodiment according to the present invention is applied to the vehicle body rear part.

A preferred embodiment of the present invention will be described in detail, referring to the drawings, as appropriate.

Figure 2:
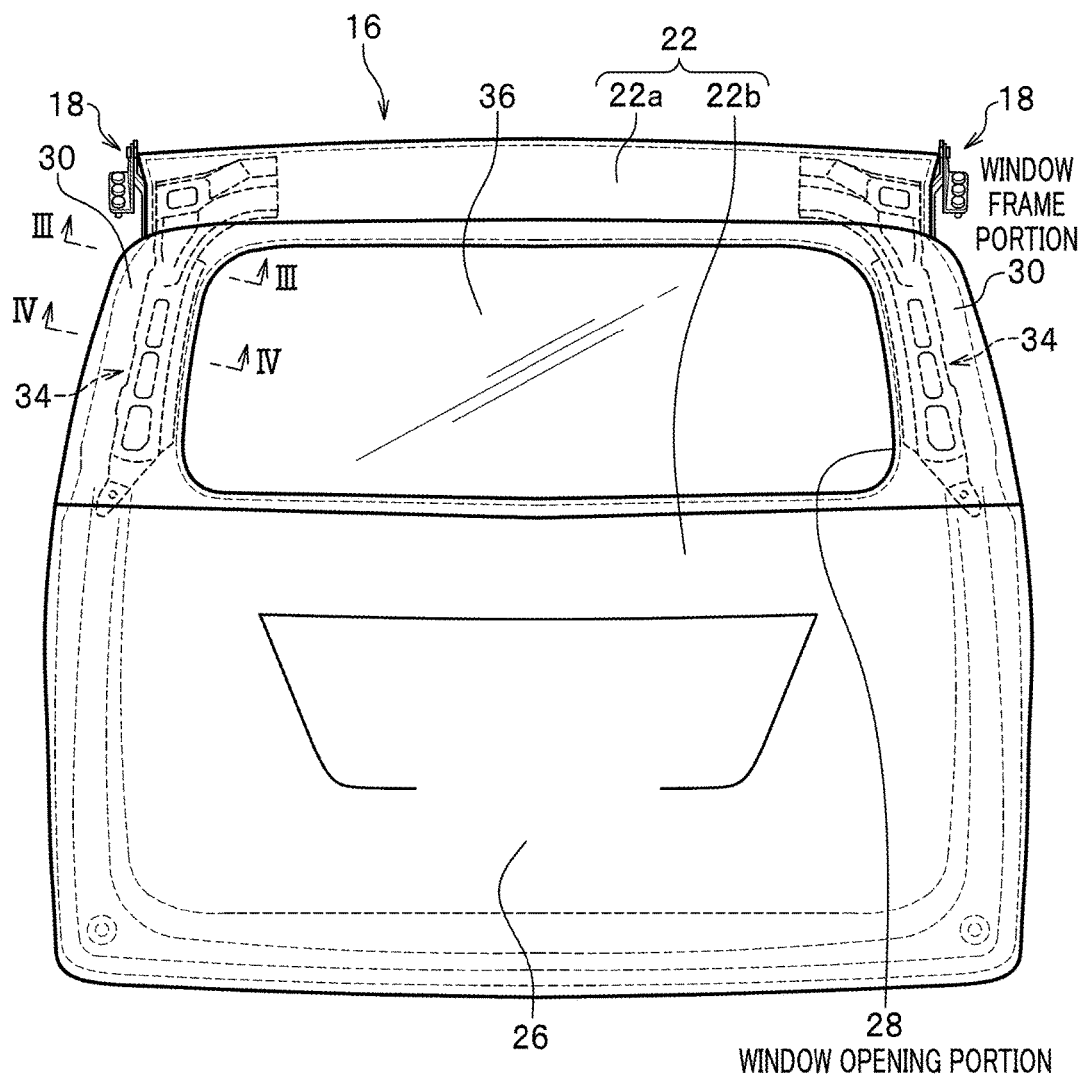
FIG. 2 is a front view of the tailgate shown in FIG. 1, in a view from the back of the vehicle body.

FIG. 1 is an exploded perspective view of a vehicle body rear part of an automobile, wherein a tailgate structure in an embodiment according to the present invention is applied to the vehicle body rear part. FIG. 2 is a front view of the tailgate shown in FIG. 1, in a view from the back of the vehicle body. Incidentally, in the respective views, 'front-rear' represents the vehicle front-rear direction, 'left-right' represents the vehicle transverse direction (left-right direction), and 'upper-lower' represents the vehicle upper-lower direction (vertical upper-lower direction).

As shown in FIG. 1, an automobile 10 is provided with a tailgate 16 capable of opening and closing a tailgate opening portion 14 formed at the rear part of a vehicle body 12, and a pair of hinge mechanisms (hinges) 18, 18 for axially supporting the tailgate 16 on the vehicle body 12 rotatably with respect to the vehicle body 12. Incidentally, on the vehicle transverse both sides and on the vehicle compartment side, of the tailgate 16, there are arranged a pair of open stays (for example, gas damper) 20, 20 that connect the tailgate 16 and the vehicle body 12.

The tailgate 16 is provided with an outer panel 22 arranged on the vehicle exterior side, and an inner panel 24 arranged on the vehicle compartment side of the outer panel 22. The outer panel 22 includes an outer upper 22a and an outer lower 22b. Incidentally, the tailgate 16 may be arranged such as to include a lining, not shown, for covering the inner panel 24 from the vehicle compartment side. The outer panel 22 and the inner panel 24 are made of resin materials.

As shown in FIG. 2, the tailgate 16 is provided with a tailgate main body 26 and a window frame portion 30 located in the upper portion of the tailgate main body 26 and having a window opening portion 28 substantially in a rectangular shape. At the both ends, in the vehicle transverse direction, of the upper portion of the window frame portion 30, there are respectively arranged hinge reinforcement members 34 fitted to respective hinge mechanisms 18. A window glass 36 is attached to the window opening portion 28 so that the window glass 36 closes the window opening portion 28.

The window glass 36 is disposed at a position separated toward the vehicle exterior side from the hinge reinforcement members 34 such as to face the hinge reinforcement members 34 (see FIG. 3 and FIG. 4 described later). The window glass 36 is not bonded to the hinge reinforcement members 34 but is bonded only to the window frame portion 30 (an outer sidewall 40 described later). By bonding the window glass 36 to the inside of the window frame portion 30, the closed cross-section can be made small. Incidentally, by forming a closed cross-section, if the efficiency of the rigidity of the closed cross-section is satisfactory, it is possible to make the above-described bonding unnecessary.

Figure 3:
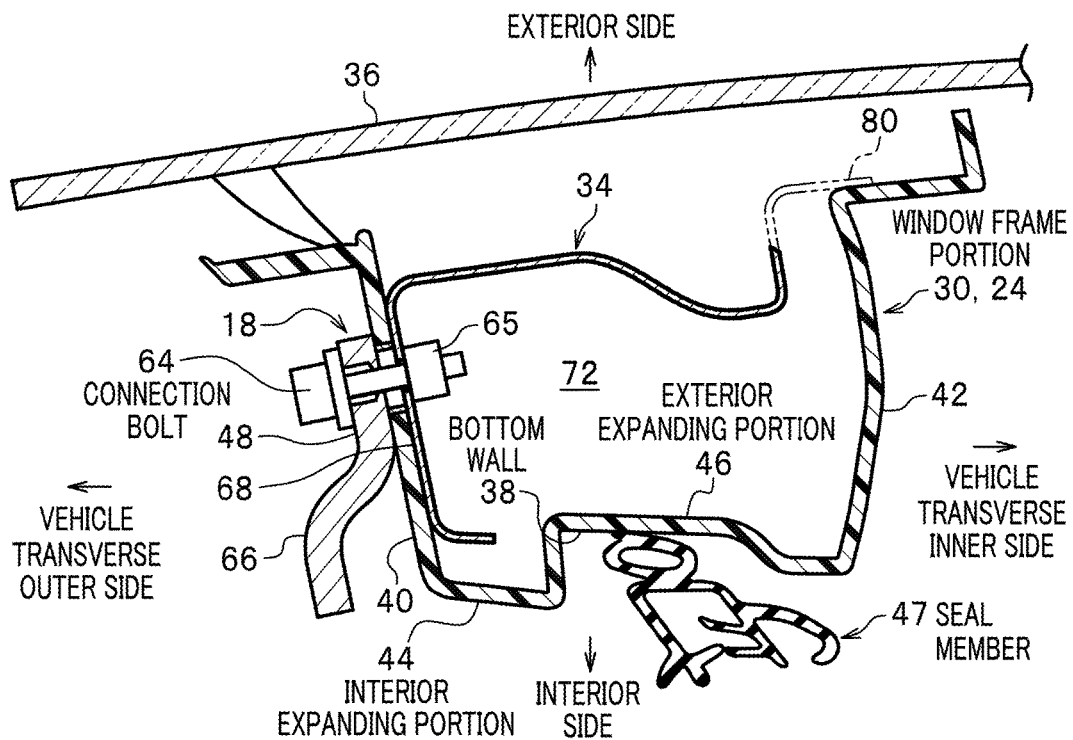
FIG. 3 is a cross-sectional view taken along line III-III in FIG. 2.
Figure 4:
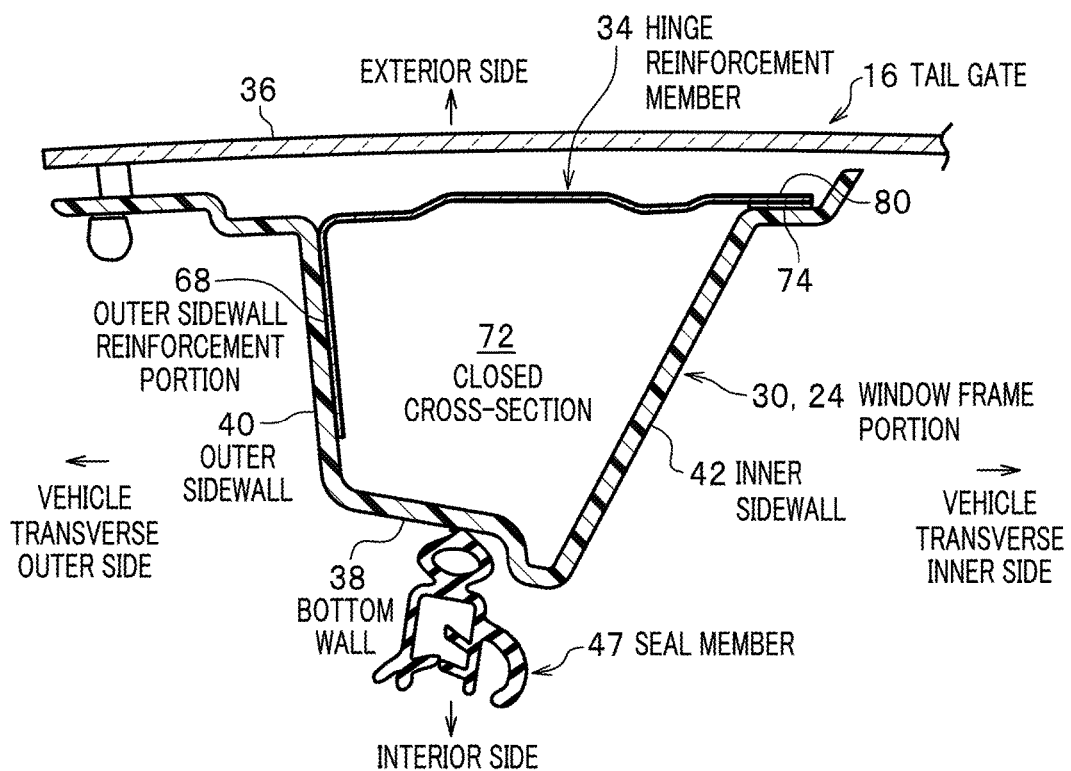
FIG. 4 is a cross-sectional view taken along line IV-IVI in FIG. 2.

FIG. 3 is a cross-sectional view taken along line III-III in FIG. 2, and FIG. 4 is a cross-sectional view taken along line IV-IV in FIG. 2.

As shown in FIG. 3 and FIG. 4, the window frame portion 30 is substantially formed by the inner panel 24, and is structured by a bottom wall 38 located on the vehicle interior side, the outer sidewall 40 (one sidewall) extending from the end portion, on the vehicle lateral outer side (the hinge mechanism 18 side), of the bottom wall 38 toward the vehicle exterior side, and an inner sidewall 42 (the other one sidewall) extending from the end portion, on the vehicle transverse inner side (a window opening portion 23 side), of the bottom wall 38 toward the vehicle exterior side. The bottom wall 38 includes, as shown in FIG. 3, an interior expanding portion 44 expanding toward the vehicle interior side, and an exterior expanding portion 46 expanding toward the vehicle exterior side.

On the vehicle laterally outer side of the interior expanding portion 44, a later-described outer sidewall reinforcement portion (sidewall reinforcement portion) 68 is located. On the surface of the exterior expanding portion 46, the surface adjoining the vehicle interior side, a seal member 47 is provided such as to contact the surface to seal between the tailgate 16 and the vehicle body 12. The seal member 47 is formed, for example, from a rubber material or a resin material.

Figure 5:
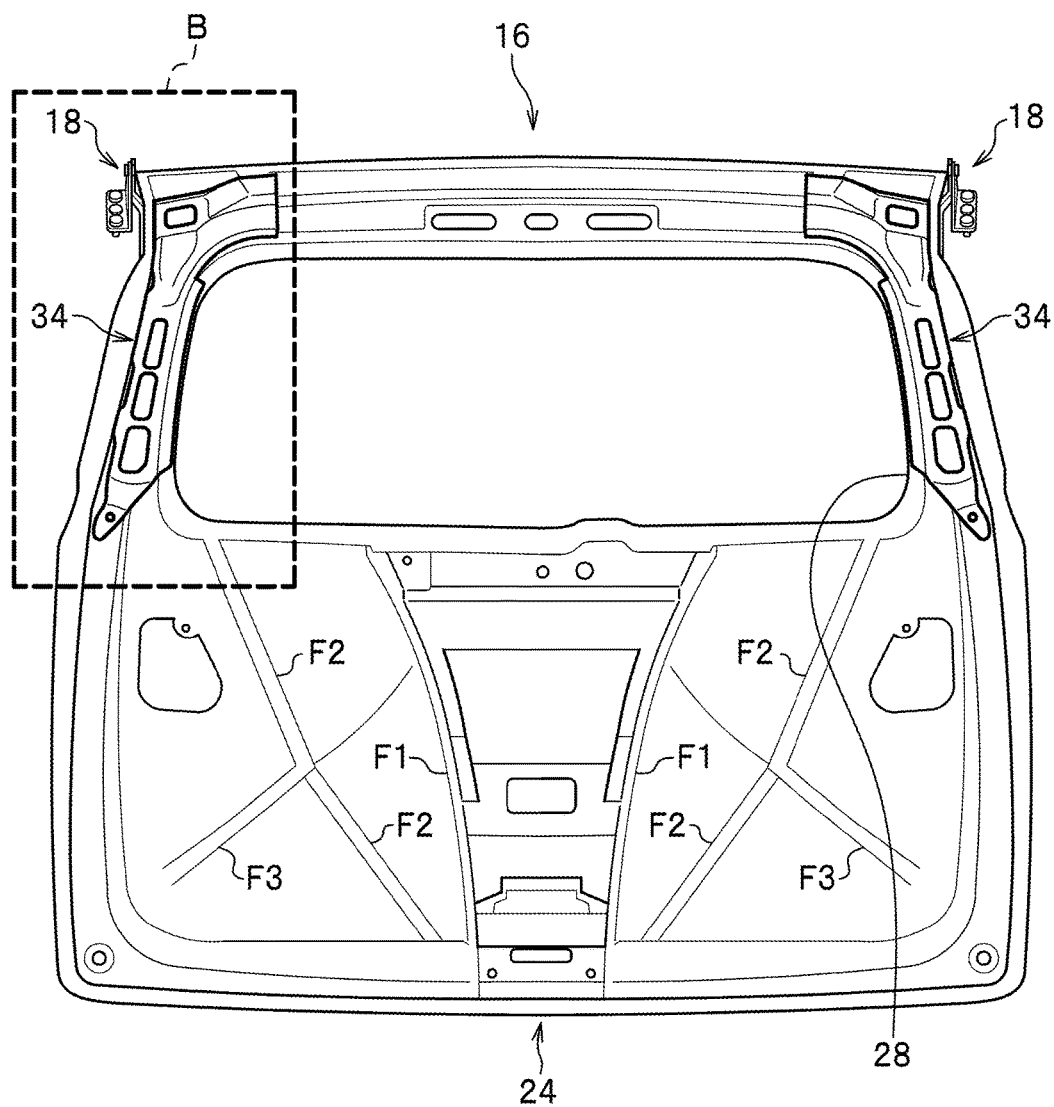
FIG. 5 is a front view, from the back of the vehicle, of a state that an outer panel and a window glass are removed from the tailgate shown in FIG. 2.
Figure 6:
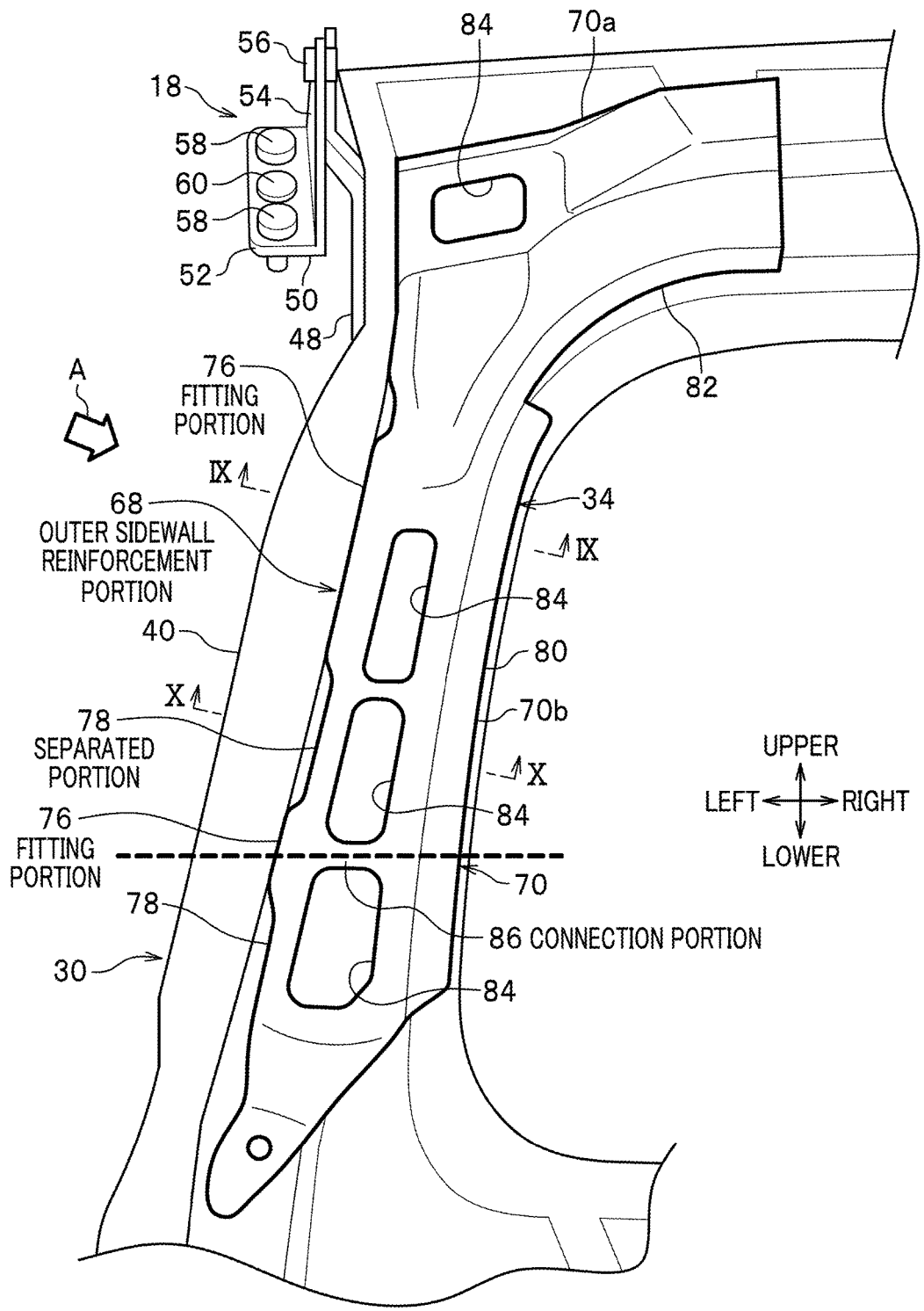
FIG. 6 is an enlarged front view of the part B shown in FIG. 5.
Figure 7:
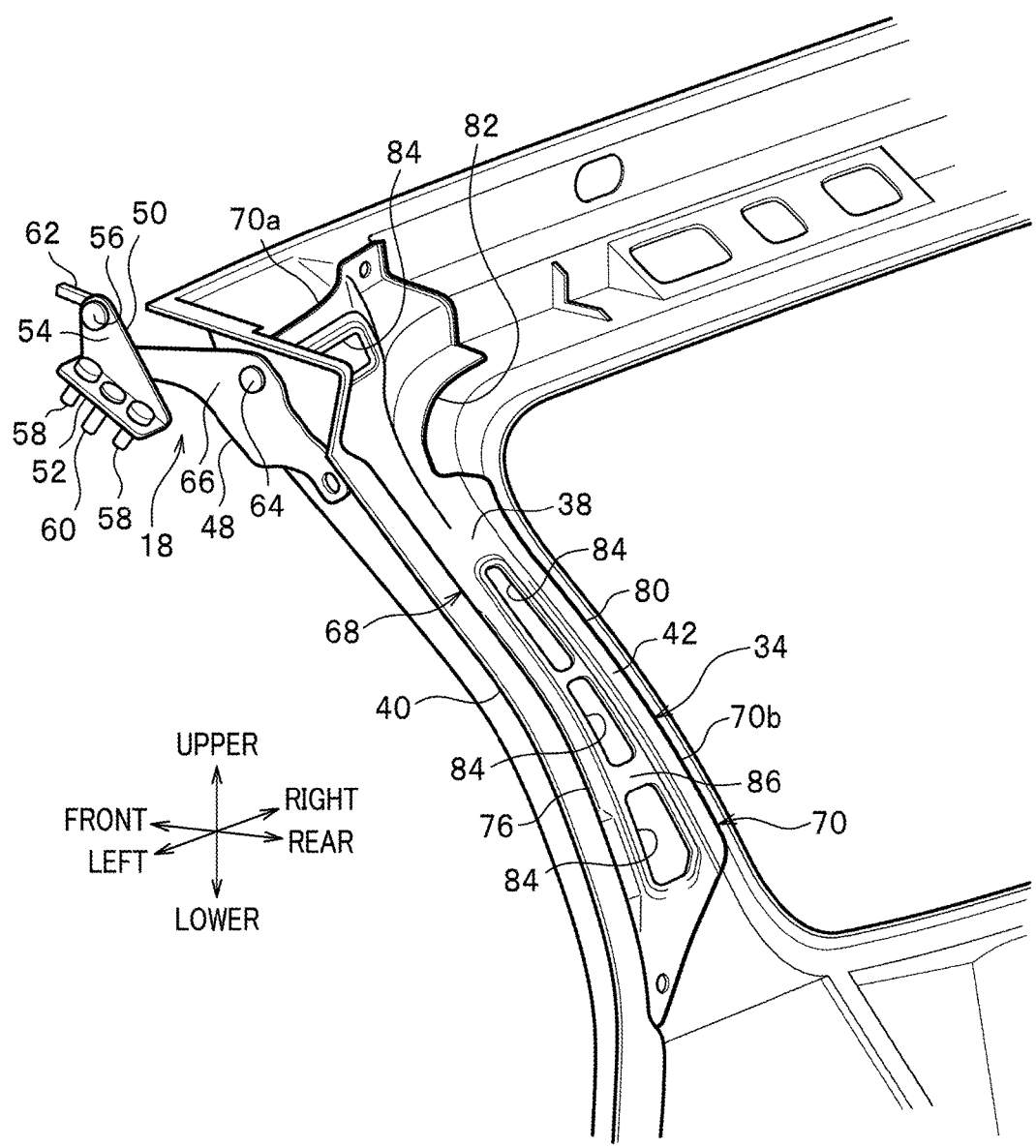
FIG. 7 is an arrow view in a view from the direction of arrow A in FIG. 6.
Figure 8:
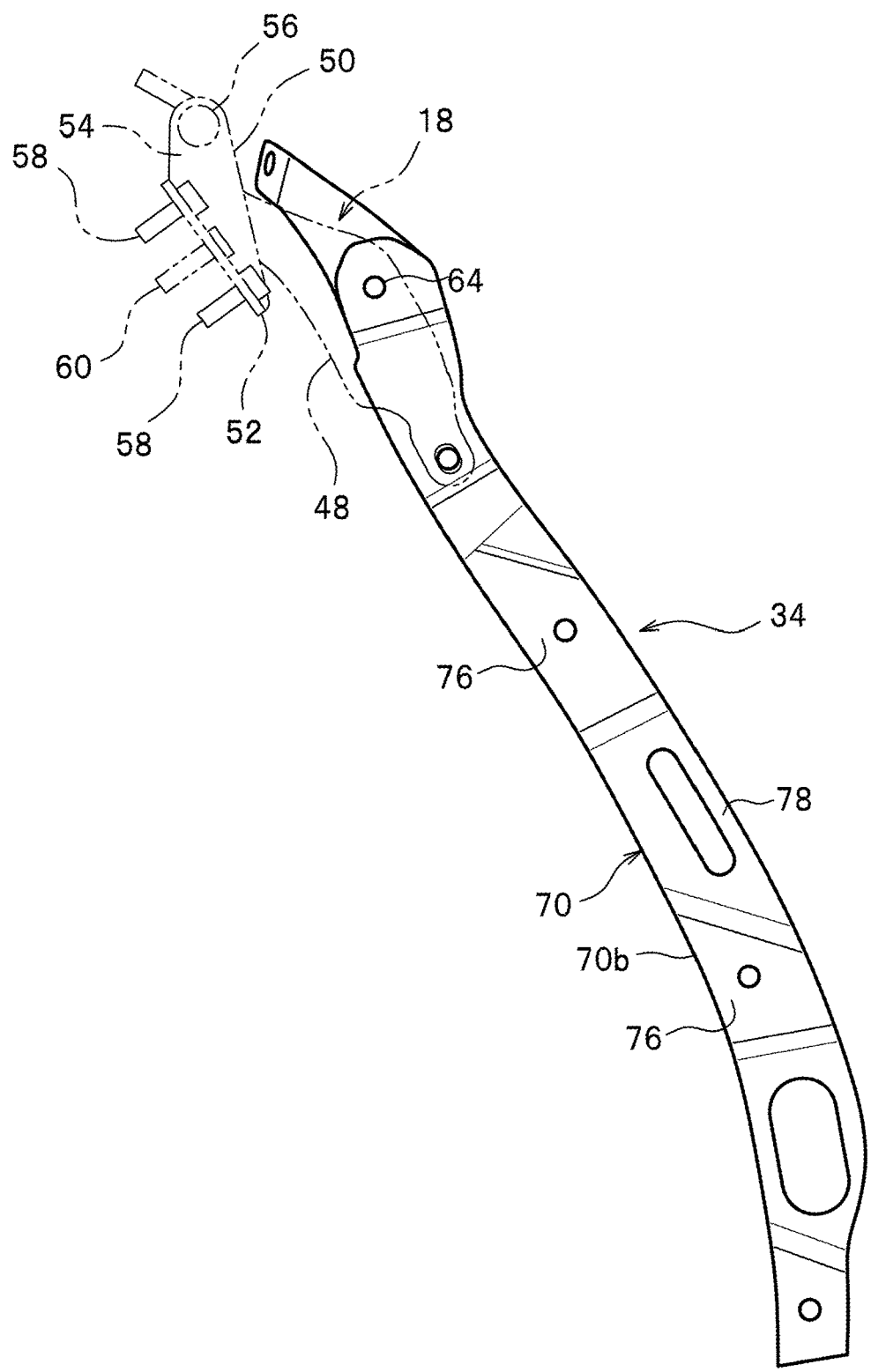
FIG. 8 is a side view of a hinge reinforcement member.
Figure 9:
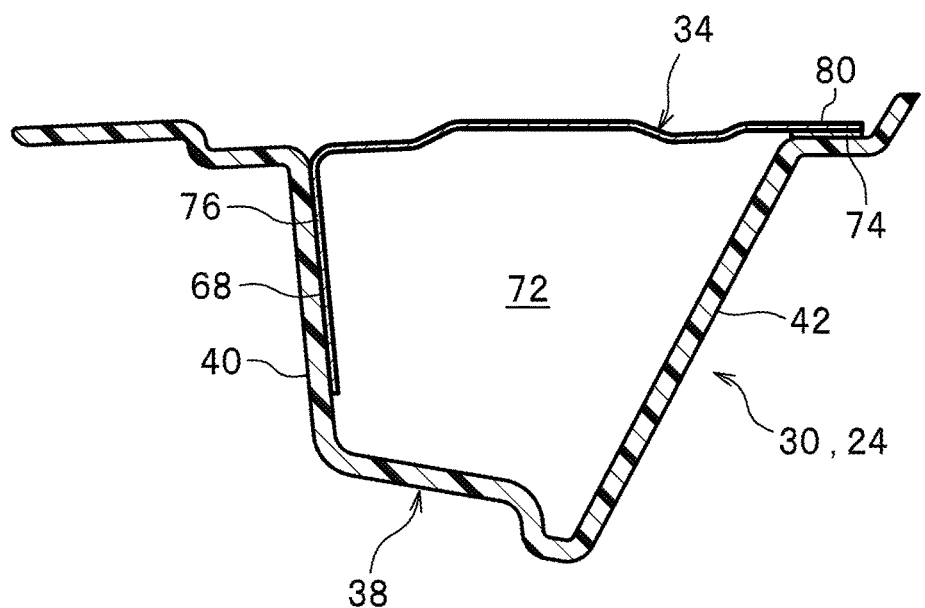
FIG. 9 is a cross-sectional view taken along line IX-IX in FIG. 6.
Figure 10:
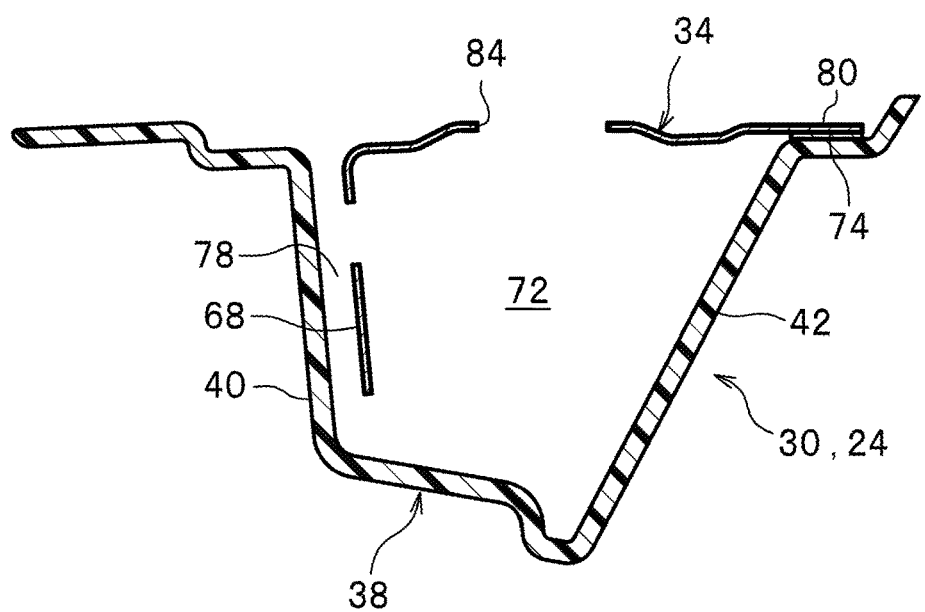
FIG. 10 is a cross-sectional view taken along line X-X in FIG. 6.

FIG. 5 is a front view, from the back of the vehicle, of a state that the outer panel and the window glass are removed from the tailgate shown in FIG. 2. FIG. 6 is an enlarged front view of the part B shown in FIG. 5. FIG. 7 is an arrow view in a view from the direction arrow A in FIG. 6. FIG. 8 is a side view of the hinge reinforcement member. FIG. 9 is a cross-sectional view taken along line IX-IX in FIG. 6. FIG. 10 is a cross-sectional view taken along line X-X in FIG. 6.

As shown mainly in FIG. 7, the hinge mechanism 18 is fitted to the rear upper portion of the vehicle body 12 (see FIG. 1), and is provided with a left-right pair of hinge members 48, 48 that support the tailgate 16, enabling the tailgate 16 to rotationally open and close, and hinge fitting seats 50 for fitting the respective hinge members 48 to the vehicle body 12.

The each hinge fitting seat 50 includes a base plate portion 52 fastened and fixed to the vehicle body 12 and a hinge pivot-support plate portion 54 formed such as to bend from the side portion of the base plate portion 52 substantially perpendicular to the base plate portion 52. The hinge pivot-support plate portion 54 is provided with a rotation shaft 56 with an axial direction in the vehicle transverse direction. The hinge member 48 is connected to the hinge pivot-support plate portion 54 rotatably with the rotation shaft 56 as the center. The base plate portion 52 is provided with a pair of fitting pins (for example, rivets) 58, 58 protruded, inserted and fitted to fitting holes, not shown, on the vehicle body 12 side. A positioning pin 60 is arranged, protruding between the pair of fitting pins 58, 58.

The hinge member 48 includes an arm portion 62 axially supported by the rotation shaft 56, rotatably on the vehicle front side, and a gate support portion 66 integrally formed with the arm portion 62 and supported on the tailgate 16 side through a connection bolt 64 and a nut 65. As shown in FIG. 3, the support portion 66 is fastened and supported at the outer sidewall 40 and the later-described outer sidewall reinforcement portion 68 respectively, being fastened and together by the connection bolt 64 and the nut 65 substantially from the horizontal direction. Incidentally, means for fastening the hinge member 48, the outer sidewall 40, and the outer sidewall reinforcement portion 68 together is not limited to the connection bolt 64 and the nut 65, and other connecting means or fitting means may be adopted.

As shown in FIG. 6, the hinge reinforcement member 34 is made of a metallic material and has a main body portion 70 bent substantially in an L-shape in a view from the vehicle back side. The main body portion 70 is integrally formed by a lateral portion 70a extending substantially along the vehicle transverse direction and a longitudinal portion 70b extending along the vehicle upper-lower direction. The outer sidewall reinforcement portion 68 extending along the outer sidewall 40 of the window frame portion 30 is provided on the outer side along the vehicle lateral direction of the main body portion 70. Incidentally, the material of the hinge reinforcement member 34 is not limited to a metal and, for example, may be a resin.

As shown in FIG. 4, the tip end portion of the outer sidewall 40 and the tip end portion of the inner sidewall 42 of the window frame portion 30, which are adjacent to the window glass 36, are connected with each other so that the hinge reinforcement member 34 forms a closed cross-section 72. The closed cross-section 72 is structured by the outer sidewall 40 and the inner sidewall 42 facing each other on the vehicle transverse outer side and the vehicle transverse inner side, the bottom wall 38 connecting the lower portions of the outer sidewall 40 and the inner sidewall 42, and the hinge reinforcement member 34 connecting the exterior ends of the outer sidewall 40 and the inner sidewall 42, the exterior ends being located at the respective upper portions of the outer sidewall 40 and the inner sidewall 42. Incidentally, the hinge reinforcement member 34 and the exterior end of the inner sidewall 42 are bonded by an adhesive agent.

The outer sidewall reinforcement portion 68 includes a fitting portion 76 (see FIG. 9), which is fitted to the outer sidewall 40 and in contact with the outer sidewall 40, and a separated portion 78 (see FIG. 10), which is not in contact with but separated from the outer sidewall 40. The fitting portion 76 and the separated portion 78 are disposed alternately along the axial direction of the longitudinal portion 70b so that concavity and convexity are formed on the side portion on one side of the main body portion 70 (see FIG. 6).

Further, as shown in FIG. 6 and FIG. 7, the hinge reinforcement member 34 includes a fitting wall 80 extending along the inner sidewall 42 adjacent to the window opening portion 28 on the side opposite to the outer sidewall reinforcement portion 68. The fitting wall 80 is arranged such as to extend in the vehicle upper-lower direction along the axial direction of the longitudinal portion 70b. At the lower portion of the lateral portion 70a, formed is an arc portion 82 extending on the vehicle transverse inner side continuously from the fitting wall 80.

Further, at the upper portion of the main body portion 70 and between the outer sidewall reinforcement portion 68 of the main body portion 70 and the fitting wall 80, formed are plural penetration holes (opening portions) 84 penetrating through from the front side to the back side. Connection portions 86 are arranged between the penetration holes 84, 84. As shown in FIG. 6, the connection portions 86 and the fitting portions 76 are disposed at positions superposed with each other along the vehicle transverse direction (see thick dashed line).

Further, the tailgate 16 has, as shown in FIG. 5, a tailgate frame structure formed by a pair of first frames F1 extending from a LOCK portion on the lower side toward a WIPER fitting portion on the upper side, a pair of second frames F2 connected from the outer side of the LOCK portion to the lower side of a pillar, and a pair of third frames F3 radially extending from the respective middle portions of the second frames F2 toward the outer end. The pair of second frames F2 form a V-shape frame substantially in a V-shape by one and the other one of the second frames F2. In the present embodiment, an optimum tailgate frame structure can be obtained, based on input from the LOCK portion and disposition of a function component and the like.

The automobile 10, to which the tailgate structure in the present embodiment is applied, is structured on the basis as described above. In the following, the operations and advantages of the automobile 10 will be described.

In the present embodiment, the hinge reinforcement member 34 made of metal connects the ends, on the vehicle exterior side, of the outer sidewall 40 and the inner sidewall 42 to each other and thereby makes the window frame portion 30 of resin have a closed cross-sectional shape. It is thereby possible to transfer a heavy load to the vehicle body 12 through the hinge mechanisms 18 and the hinge reinforcement members 34, for example, when a heavy load is input to the tailgate 16.

In such a manner, in the present embodiment, opening deformation such that the window frame portion 30 opens can be inhibited and deformation of the tailgate 16 can be inhibited. As a result, in the present embodiment, even in case that the window frame portion 30 of the tailgate 16 is made of resin, desired rigidity of the tailgate 16 can be easily ensured. Further, an input load applied to the tailgate 16 can be received by the whole including the first frames F1 connected to the LOCK portion and also the second frames F2 connecting the WIPER portion and the LOCK portion, and further the load input applied to the tailgate 16 can be received, being dispersed by plural frames.

Further, in the present embodiment, as a closed cross-section is formed, a hinge reinforcement member 34, which has been conventionally used, can be utilized, and it is thereby unnecessary to add separate members, which enables a simple structure.

Further, in the present embodiment, as the outer sidewall reinforcement portion 68 is arranged along the outer sidewall 40 of the window frame portion 30, the strength of the outer sidewall 40 can be improved. Still further, the three, which are the hinge member 48, the outer sidewall reinforcement portion 68, and the outer sidewall 40, are fastened together by the connection bolt 64 and the nut 65, when a heavy load is input to the tailgate 16, a load can be directly transferred from the outer sidewall 40 to the hinge member 48. Thus, in the present embodiment, it is possible to inhibit opening deformation such that the window frame portion 30 opens can be inhibited, and deformation of the tailgate 16 can be even more inhibited. Yet further, in the present embodiment, the manufacturing cost can be reduced by decreasing the number of fitting processes and the number of components. Still further, in the present embodiment, by disposing the outer sidewall reinforcement portion 68 of the hinge reinforcement member 34 along and adjacent to the outer sidewall 40, it is possible to efficiently ensure a wire lining space for works of lining wires such as harness even with, for example, the comparatively small closed cross-section 72.

Further, in the present embodiment, as the interior expanding portion 44 is expanding toward the vehicle interior side, in comparison with, for example, a case of not providing the interior expanding portion 44, it is possible to dispose (the lower end of) the hinge reinforcement member 34 adjoining the recessed portion of the interior expanding portion 44 and the window frame portion 30, in a non-contact state (see FIG. 3). Still further, as the exterior expanding portion 46 is extending toward the vehicle exterior side, it is possible to endure a space for disposing the seal member 47, and improve the surface accuracy for making the seal member 47 contact with the bottom wall 38 (exterior expanding portion 46) (see FIG. 3). In the present embodiment, by structuring the bottom wall 38 of the window frame portion 30 by the interior expanding portion 44 and the exterior expanding portion 46, the space adjacent to the bottom wall 38 can be efficiently utilized.

Yet further, in the present embodiment, there are arranged the separated portion 78, which does not require fitting the outer sidewall reinforcement portion 68 to the outer sidewall 40, and the fitting portion 76, which requires fitting the outer sidewall reinforcement portion 68 to the outer sidewall 40, and it is thereby possible to ensure the accuracy of the fitting surface, of the fitting portion 76, for fitting to the outer sidewall 40. Further, as the fitting portions 76 and the separated portions 78 are formed on the same member and in a concavity and convexity shape, it is possible to improve the rigidity of the outer sidewall reinforcement portion 68, compared with a case of a flat plate without a concavity and convexity shape.

Still further, in the present embodiment, the hinge reinforcement member 34 includes the plural penetration holes 84 and the connection portions 86 each of which being arranged penetration holes 84, 84 adjacent to each other. These connection portions 86 and the corresponding portions 84 are disposed at positions superposed with each other along the vehicle transverse direction, and it is thereby possible to improve the rigidity of the hinge reinforcement member 34 and the rigidity of the closed cross-section 72, with a minimum increase in weight. For example, in case that a heavy load is input to the tailgate 16, a load that is input from the fitting portion 76 is suitably absorbed by the hinge reinforcement member 34 having rigidity, and it is thereby possible to inhibit the deformation of the tailgate 16.

Yet further, in the present embodiment, as the window glass 36 is bonded not to the hinge reinforcement member 34 but only to the window frame portion 30 (outer sidewall 40), the bonding area of the bonded portion can be minimized, and the maintenance region of it can be made small. Further, as the window glass 36 is bonded only to the window frame portion 30, the degree of freedom of setting the rear defroster and the like can be increased. Further, the window glass 36 is bonded also to the inner side of the window frame portion 30, as necessary, and the rigidity can thereby be even more improved.

Further, in the present embodiment, by disposing the first frames F1 connecting the WIPER portion and the LOCK portion in the upper-lower direction and the second frames F2 connected to the pillar on the outer side of the first frames F1, it is possible to make the dispositions of function components of, for example, an LID LIGHT, have enough rigidity. Still further, by partially bonding the frame portion to the outer panel 22, there is an advantage that it is possible to ensure the outer panel rigidity. Further, third frames F3, which radially extend from the respective middle portions of the second frames F2 toward the lower end of the outer side, are preferably arranged.

In such a manner, in the present embodiment, by forming the frame structure that connects the WIPER portion and the LOCK portion in the upper-lower direction, an input load to the WIPER portion can be dispersed, and the entire rigidity and the eigenvalue of the tailgate 16 including the second frames F2 connected to the lower side of the pillar can be increased, so that an efficient tailgate frame structure can be obtained.

Incidentally, in the present embodiment, a structure in which the outer sidewall 40 and the inner sidewall 42 of the window frame portion 30 stand up from the bottom wall 38 toward the vehicle exterior side is adopted, however, without being limited thereto, a structure in which the outer sidewall 40 and the inner sidewall 42 of the window frame portion 30 stand up from the bottom wall 38 toward the vehicle interior side may also be adopted.

What is claimed is:

1. A tailgate structure having a hinge for axially supporting a tailgate on a vehicle body, comprising:
    an inner panel made of resin and forming a window opening portion;
    an outer panel which is connected to a vehicle rear side of the inner panel; and
    a hinge reinforcement member fitted to the hinge,
    wherein the inner panel includes a bottom wall, one sidewall and another one sidewall, each of the one and the other one sidewalls extending respectively from opposite ends of the bottom wall, wherein the hinge reinforcement member forms a closed cross-section by connecting a tip end portion of the one sidewall and a tip end portion of the other one sidewall, wherein the hinge reinforcement member is a member which is different from the outer panel, wherein the hinge reinforcement member includes a sidewall reinforcement portion along the one sidewall, and wherein the hinge is fastened to the sidewall reinforcement portion and the one sidewall together.

2. The tailgate structure according to claim 1, wherein the bottom wall includes an interior expanding portion expanding toward vehicle interior side, and an exterior expanding portion expanding toward vehicle exterior side, wherein the sidewall reinforcement portion is located on the one sidewall side of the interior expanding portion, and wherein a seal member sealing the tailgate and vehicle body is in contact with a surface of the exterior expanding portion, the surface adjoining the vehicle interior side.

3. The tailgate structure according to claim 1, wherein the sidewall reinforcement portion includes a plurality of fitting portions fitted to the one sidewall, and a plurality of separated portions separated from the one sidewall, and wherein a fitting portion of the plurality of fitting portions and a separated portion of the plurality of separated portions are arranged alternately such as to form a concavity and convexity shape on the same member.

4. The tailgate structure according to claim 3, wherein the hinge reinforcement member includes a plurality of opening portions, and a connection portion between the opening portions adjacent to each other, and wherein the connection portions and the fitting portions are disposed at positions superposed with each other along a vehicle transverse direction.

5. The tailgate structure according to claim 1, wherein the tailgate includes a window glass that is disposed such as to face the hinge reinforcement member and is separated from the hinge reinforcement member toward the vehicle exterior side, and wherein the window glass is bonded only to the inner panel.

6. The tailgate structure according to claim 2, wherein the sidewall reinforcement portion includes a plurality of fitting portions fitted to the one sidewall, and a plurality of separated portions separated from the one sidewall, and wherein a fitting portion of the plurality of fitting portion and a separated portion of the plurality of separated portions are arranged alternately such as to form a concavity and convexity shape on the same member.

7. The tailgate structure according to claim 6, wherein the hinge reinforcement member includes a plurality of opening portion, and a connection portion between the opening portions adjacent to each other, and wherein the connection portions and the fitting portions are disposed at positions superposed with each other along a vehicle transverse direction.

8. The tailgate structure according to claim 2, wherein the tailgate includes a window glass that is disposed such as to face the hinge reinforcement member and is separated from the hinge reinforcement member toward the vehicle exterior side, and wherein the window glass is bonded only to the inner panel.

9. The tailgate structure according to claim 3, wherein the tailgate includes a window glass that is disposed such as to face the hinge reinforcement member and is separated from the hinge reinforcement member toward the vehicle exterior side, and wherein the window glass bonded only to the inner panel.

10. The tailgate structure according to claim 4, wherein the tailgate includes a window glass that is disposed such as to face the hinge reinforcement member and is separated from the hinge reinforcement member toward the vehicle exterior side, and wherein the window glass is bonded only to the inner panel.

11. The tailgate structure according to claim 6, wherein the tailgate includes a window glass that is disposed such as to face the hinge reinforcement member and is separated from the hinge reinforcement member toward the vehicle exterior side, and wherein the window glass is bonded only to the inner panel.

12. The tailgate structure according to claim 7, wherein the tailgate includes a window glass that is disposed such as to face the hinge reinforcement member and is separated from the hinge reinforcement member toward the vehicle exterior side, and wherein the window glass is bonded only to the inner panel.

* * * * *